Dec. 6, 1955 E. W. P. FRANZ 2,725,975
CONVEYOR MECHANISM
Filed Jan. 7, 1950 4 Sheets-Sheet 1
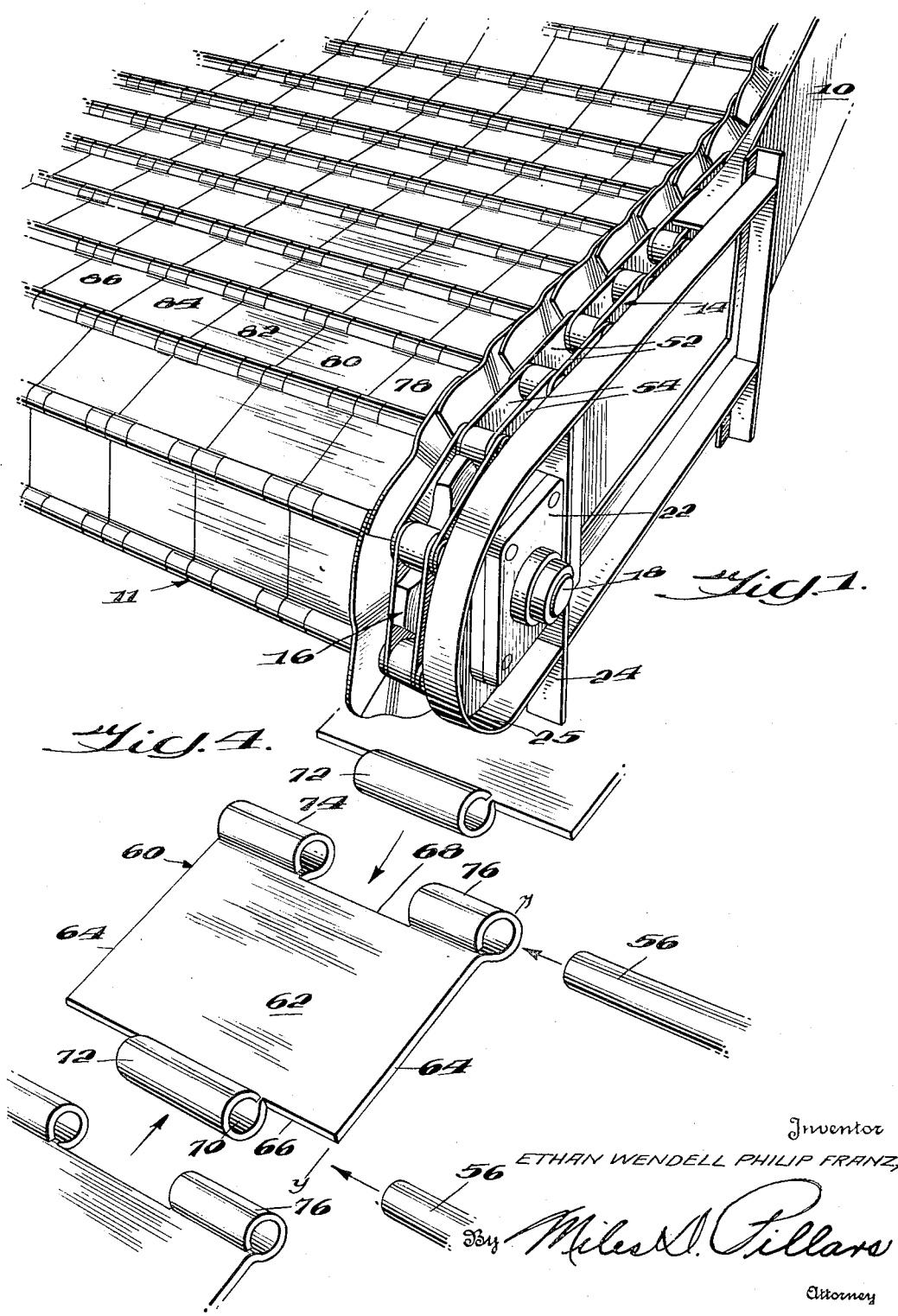
Inventor
ETHAN WENDELL PHILIP FRANZ,
By Miles N. Pillars
Attorney

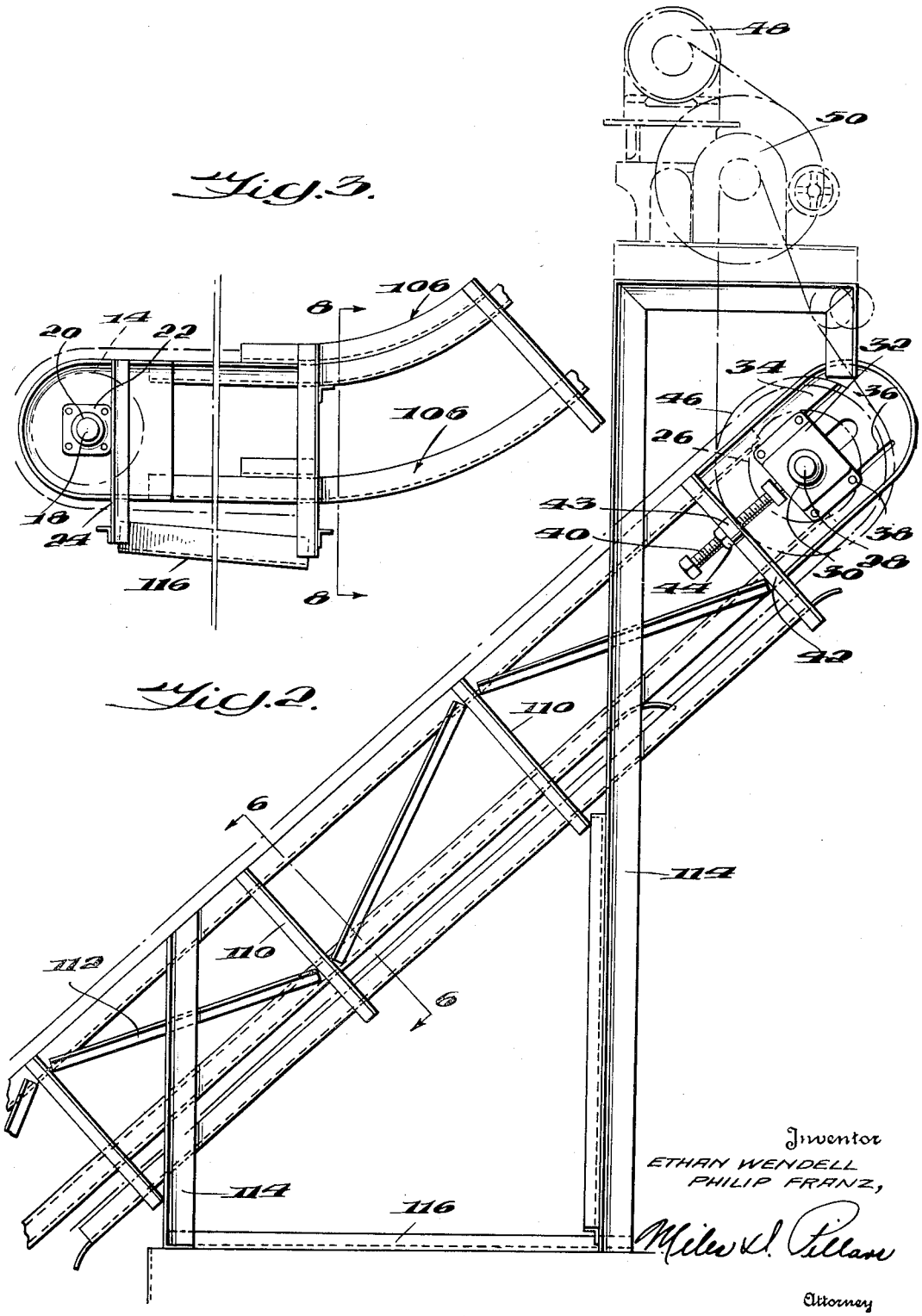

Dec. 6, 1955          E. W. P. FRANZ          2,725,975
CONVEYOR MECHANISM
Filed Jan. 7, 1950                       4 Sheets-Sheet 3

Inventor
ETHAN WENDELL PHILIP FRANZ,
By Miles S. Sellers
Attorney

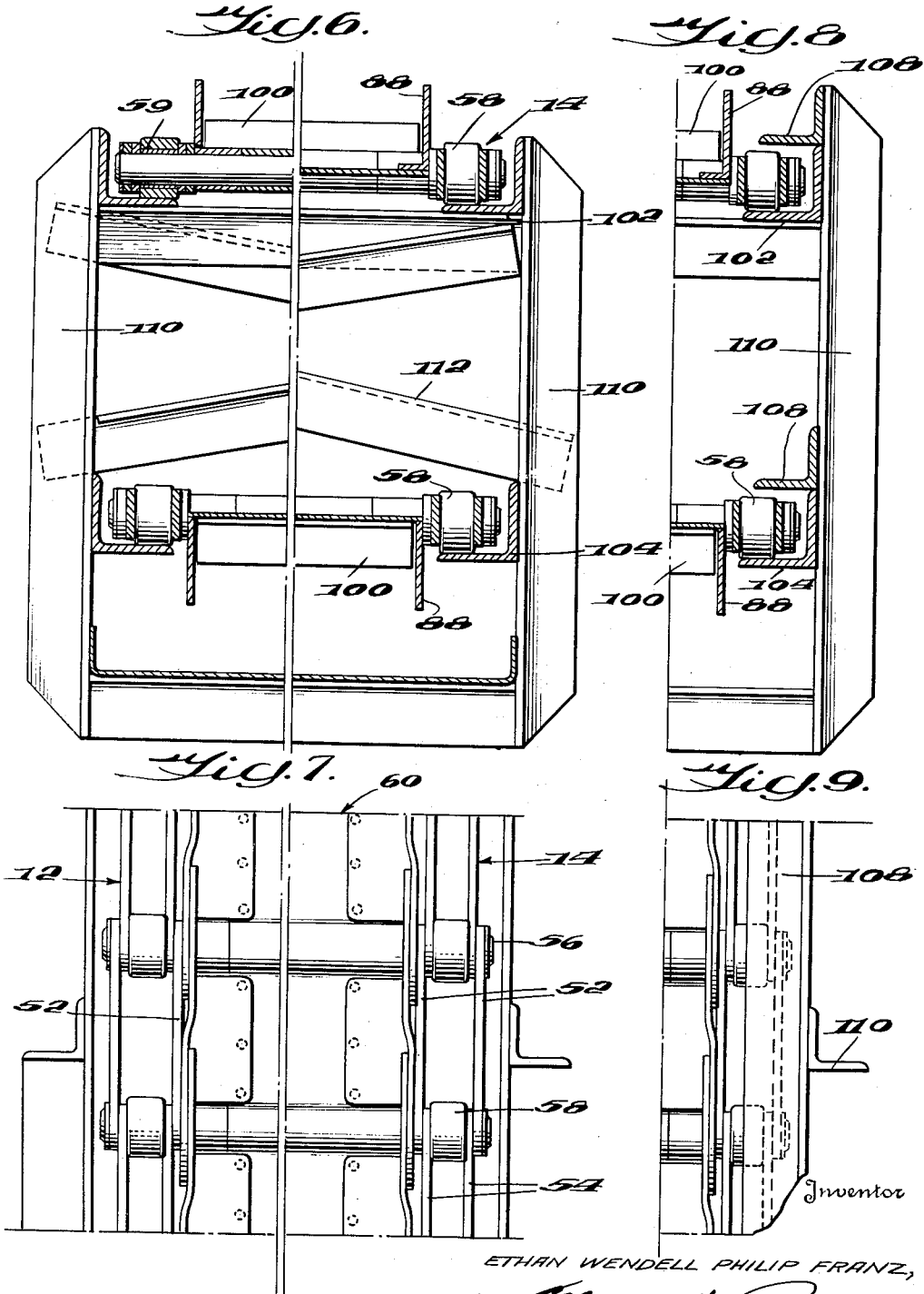

United States Patent Office 2,725,975
Patented Dec. 6, 1955

2,725,975

CONVEYOR MECHANISM

Ethan Wendell Philip Franz, Cleveland Heights, Ohio, assignor of one-third to Ruth R. Young and one-third to G. H. Meyfarth, Jr., both of Cleveland, Ohio Application January 7, 1950, Serial No. 137,396

3 Claims. (Cl. 198—196)

This invention relates generally to endless conveyor mechanism and more particularly to conveyor belts formed of a plurality of metal links which are hingedly assembled in preselected numbers in side by side and end to end relation to provide variable width and length conveyor belts.

Endless conveyors, such as those having an apron comprising independent linkages flexibly connected to form an endless traveling surface and suspended between side chains which engage sprocket wheels positioned at the ends of the conveyor are widely used in moving ore, coal, ashes, crushed stone, said, gravel and other granular material, in feeding articles and material through drying apparatus or heat-treating furnaces, such as annealing furnaces, and in transferring raw materials and articles between processing locations in manufacturing plants. One disadvantage which has heretofore been present in the construction of sectionalized apron conveyors is the occurrence of open spaces or gaps between the pivotally connected sections or linkages of the conveyor surface when the conveyor belt changes direction in traveling either around the sprocket wheels or the curved portions of the conveyor mechanism. It has been found that materials being conveyed in bulk, such as grain, coal, or other small sized items, fall through the openings, thus causing wastage and a cleaning problem and other material, such as punch press residue, cutting machine chips and the like, becomes wedged in the gaps causing the linkage sections to be sprung out of alignment, which results in excess wear and the need for extensive repair and replacement.

Specialized conveyor constructions have heretofore been suggested by a number of patentees which are intended to eliminate the formation of open spaces or gaps in the traveling conveyor surface as the linkages change direction in passing about the sprocket wheels. For example, Patent 2,045,957, dated June 30, 1936, to Kenneth D. Loose discloses a conveyor construction wherein the upper surface of the apron plates is positioned coincident with the axes of the centers of the rollers which carry the apron, and a bevel is provided on the adjacent edges of the apron plates to prevent the binding of the edges as the plates travel in a curved direction. Patent 1,800,432, dated April 14, 1931, to Lucian Buck, discloses the use of a conveyor section hinge structure wherein curved portions of the hinge are extended below and beyond the surface of the plates whereby the cooperating parts of the hinges may be maintained in contact during movement around the sprocket. Patent 1,710,883, dated April 30, 1929, to Lee Llewellyn et al., discloses the use of curved apron plates provided with semi-circular shaped hinge parts with cooperating sockets. While these and other expedients have been suggested to eliminate the formation of openings or gaps between the conveyor belt sections, they have proved expensive to manufacture and the maintenance costs resulting from the more elaborate and specialized features of construction have been excessive.

It is, therefore, an object of my invention to provide an improved link type belt or conveyor of simplified construction wherein a plurality of loop equipped links are pivotally connected by cross shafts and the end edges of the links are maintained in contiguous relationship, whereby cracks, openings, or gaps are prevented from occurring as the conveyor belt changes direction of travel in passing about the sprocket wheels or other curved portions of the mechanism.

Another object of the invention is to provide an improved conveyor formed by a plurality of conveyor links formed of metal, each provided with hinge loops on opposite end edges of the link web which are pivotally secured together by a roller equipped cross shaft with the median plane of each link web passing through the axes of the hinge loops.

Another object of the invention is to provide an improved conveyor formed of a plurality of identically shaped metal links each of which is provided with hinge loops which are positioned substantially parallel with the end edges thereof and extend on each side in complementary spaced relationship so that opposite end edges of the links may be secured by a cross shaft extending through the complementary hinge loops.

Another object of the invention is to provide an improved conveyor belt link or plate having hinge loops positioned at opposite ends of and extending above and below a body portion with the axes of the loops located in and transversely of a plane passing through the center of the body portion or web of the link.

Another object of the invention is to provide an improved conveyor link or plate formed of a substantially flat, rigid, rectangular body member provided with hinge loops located on opposite ends thereof and positioned substantially parallel thereto, with the hinge loops extending above and below the body member and positioned with their axes in a central plane disposed equal distances from the upper and lower surfaces of the body member.

Another object of the invention is to provide an improved conveyor link formed of a substantially flat, rigid rectangular body member having a centrally located hinge loop along one end edge and two hinge loops along the opposite end edge with the terminal edges of each of the two loops in substantial alignment with the side edges of the body member and the opposite edges of each of the two loops spaced a distance apart equal to the length of the central hinge loop with all of the hinge loops extending above and below the body member and positioned with their axes in a central plane disposed equal distances from the upper and lower surfaces of the body member.

A still further object of the invention is to provide an improved conveyor belt formed of a plurality of hinged links and provided with upstanding wings at each side thereof which are located in overlapping relationship to form a continuous trough throughout the entire travel of the conveyor.

A still further object of the invention is to provide an improved conveyor belt which may be constructed in variable widths by selecting a number of hinge loop equipped belt links which are secured in side by side relation by cross shafts passing through said hinge loops.

A still further object of the invention is to provide an improved conveyor belt formed of a plurality of hinged links each of which is reinforced by transversely extending supporting members positioned on a surface of the links.

The invention also resides in certain novel structural characteristics and features which facilitate the carrying out of the foregoing objects and which contribute both to the simplicity of the conveyor structure and to its ruggedness of construction, as well as to the dependability of its operation.

Further objects and advantages of the invention will become apparent from the following detailed description taken in connection with the accompanying drawings, in which:

Figure 1 is a perspective view of an end portion of the improved conveyor mechanism Figure 2 is a side elevation of the upper position of a conveyor mechanism embodying the invention;

Figure 3 discloses the lower end portion of the conveyor disclosed in Figure 2;

Figure 4 is an exploded perspective view of conveyor links indicating the manner in which the longitudinal series of links are pivotally secured;

Figure 6 is a cross sectional view taken on line 6—6 of Figure 2;

Figure 7 is a modified plan view of the mechanism indicated in Figure 6;

Figure 8 is a cross sectional view taken on line 8—8 of Figure 3;

Figure 9 is a modified plan view of the conveyor mechanism shown in Figure 8;

Figure 12:
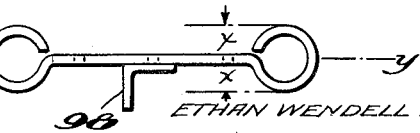

Figure 12 discloses a side elevation of a modified form of belt link which is provided with a reinforcing member.

While the invention is susceptible of various modifications and alternative constructions, I have shown in the drawings and will herein describe in detail the preferred embodiment. It will be understood, however, that I do not intend to limit the invention by such disclosure, for I aim to cover all modifications and alternative constructions falling within the spirit and scope of the invention as defined in the appended claims.

The endless conveyor mechanism identified by reference numeral 10 which forms the subject matter of the invention, comprises a movable apron or belt 11 carried by a pair of chains 12 and 14 which are arranged in side by side relation and spaced a distance apart corresponding to the width of the conveyor belt. A pair of sprocket wheels 16 support the chain adjacent the delivery end of the conveyor. These sprocket wheels are mounted on a transversely extending shaft 18 and are laterally secured thereon to space the chains the desired distance apart. The extremities of shaft 18 are journalled in bearings 20 which are mounted upon vertically positioned supporting plates 22. These plates are secured to vertically disposed structural member 24 and flange member 25 by riveting, welding, or the like.

The chains 12 and 14 are supported at the discharge end of the conveyor by a pair of sprockets wheels 26, which are mounted upon a transversely extending shaft 28 in alignment with sprocket wheels 16. Shaft 28 is journalled at its ends in bearings 30 which are supported on movable blocks 32. The position of shaft 28 may be adjusted longitudinally of the conveyor mechanism by the movement of blocks 32 in order to adjust the tension of the conveyor mechanism. The blocks 32 are slidably supported on plates 34 in any convenient manner, such, for example, as by the use of slots 36 and bolts 38, and can be adjusted lengthwise of the conveyor by rotation of screw 40. Structural member 42 has secured thereon a nut 43 which is threaded to receive screw 40 with an end thereof in engagement with blocks 32. A lock nut 44 serves to secure screw 40 and block 32 in adjusted position. The chains 12 and 14 may be driven in any suitable manner to effect movement of the conveyor, such, for example, as by the use of a pulley or sprocket wheel 46 secured to shaft 28 which may be rotated by motor 48 through reduction gearing 50. It will be apparent that the motive power to drive the conveyor mechanism may be applied to shaft 18 or other parts of the conveyor without departing from the spirit of this invention.

Figure 5:
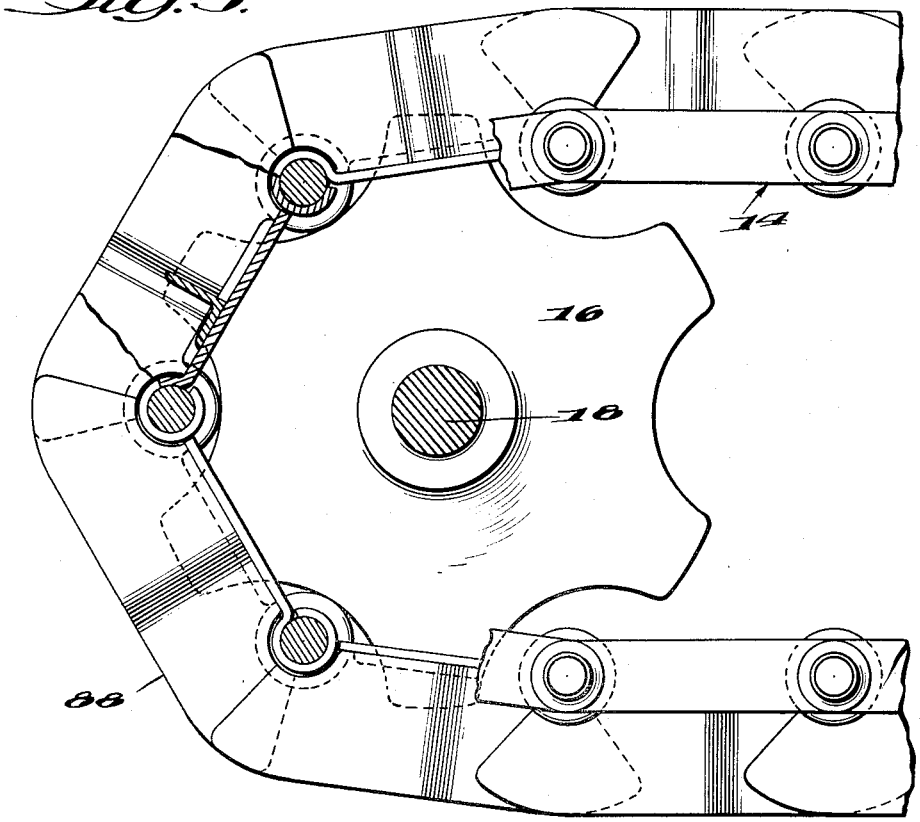
Figure 5 is a side elevation partly in section which discloses a conveyor sprocket, chains, and belt links, together with the side wings of the conveyor.

Each of the chains 12 and 14 consists of a longitudinal series of pairs of outside link-bars 52 and a series of pairs of inside link-bars 54. The pairs of outside link-bars alternate with the pairs of inside link-bars throughout the length of the chains with the ends of each of the pairs thereof in overlapping relationship. The overlapped end portions of the inside and outside link-bars are provided with aligned apertures to receive the extremities of cross shafts 56 which serve to secure the link-bars in chain form. Carrying rollers 58 are mounted on the cross shafts 56 between the pairs of inside link-bars 54 and serve both as spacing elements for the link-bars and as guiding members for the conveyor platform. The carrying rollers are preferably provided with bearings 59 and are freely rotatable upon the cross shafts. Means (not shown), such, for example, as washers and cotter pins or the like, are employed as keeper members to maintain the outer link-bars against axial displacement with respect to the cross shafts. The teeth of the sprocket wheels 16 and 26 enter the spaces between each of the pairs of link-bars, as is shown in Figure 5, during rotation of shafts 18 and 28, and the carrying rollers engage the concave portions between the sprocket teeth to provide for a smooth turning movement of the conveyor belt between the upper and lower reaches of the endless belt.

As is best shown in Figures 6 and 7, the cross shafts 56 extend transversely of the conveyor belt and serve as hinge or pivot pins for hingedly securing the conveyor links, identified by reference numeral 60, which form the traveling apron or platform of the conveyor. The traveling platform is formed of a plurality of longitudinally arranged links which are identically formed with hinge loops positioned on opposite ends of the links. In order to obtain conveyor belts of variable width, one or more longitudinal rows of links may be assembled upon the cross shafts in side by side location, as is shown in Figure 1 of the drawings.

The belt links 60 employed in my improved conveyor mechanism are best shown in Figures 4 and 12 and comprise a body portion 62 which is rectangular in shape and has side edges 64 and end edges 66 and 68. The body portion of the conveyor links 60 is preferably formed of metal having a sufficient thickness to provide a high degree of rigidity for the link. The upper and lower surface portions of the body portion 62 are substantially flat and serve when the links are assembled in the conveyor mechanism as the traveling surface of the platform.

Each of the conveyor links 60 is provided with a plurality of loops 72, 74, and 76 by which the links are hingedly secured in position in the conveyor belt. The hinge loops are positioned parallel with and coincident to end edges 66 and 68 of the body portion 62 with the adjacent interior bearing surfaces 70 of the loops spaced a distance from the end edges corresponding to the thickness of the material from which the hinge loops are formed. As is shown in Figure 4, hinge loop 72 is centrally positioned along end edge 66 of the body portion 62 and hinge loops 74 and 76 are located on opposite end edge 68. The outer terminal ends of loops 74 and 76 are aligned with each of the side edges 64 of the body portion 62, and the opposite or inner ends of loops 74 and 76 are spaced a distance apart substantially equal to the length of hinge loop 72. The hinge loops of the links 60 extend above and below the surfaces of the body member as is represented by the vertical distances "X" indicated in Figure 12.

The conveyor belt is formed by assembling a plurality of conveyor links 60 in end to end relationship between the cross shafts 56 which have heretofore been described. As is indicated by the exploded view shown in Figure 4, the central loop 72 of a link is positioned between and in alignment with loops 74 and 76 of the next adjacent link and a cross shaft is inserted through the appended loops to hingedly secure the adjacent links. The central loop 72 of a link which adjoins on the opposite side is positioned between the hinge loops 74 and 76 and when the loops are in axial alignment another cross shaft 56 is inserted to secure these adjoining links in hinged relationship. In this manner the similarly formed loops of each link are alternately disposed in hinged relationship and as many links are pivotally connected together as is necessary to complete a desired length of conveyor belt.

In order to prevent the occurrence of cracks, openings, or gaps as the conveyor belt changes direction of travel in passing about the sprocket wheels or curved portions of the conveyor trackage, the axes of hinge loops 72, 74, and 76 are located within the median plane of the body member, i. e., in a central plane disposed equal distances from the upper and lower flat surfaces of the body member, as is indicated by plane Y—Y of Figure 12 which passes through the middle of the body portion of the link.

As will be apparent from Figures 4 and 5, the outer wall of loop 72 and the outer walls of loops 74 and 76 are positioned closely adjacent to edges 68 and 66 respectively of successive links. Only minor clearances are provided between the edges 66 and 68 and the adjacent loops in order to prevent frictional binding upon rotation of the links relative to each other as the conveyor belt changes direction. By the construction thus described, the links pivot about axes which lie in a median plane disposed equal distances between the upper and lower surfaces of the links. Upon rotation of the links as the conveyor belt changes direction, edges 66 and 68 maintain their relative position with respect to loops 72, 74 and 76 and thus no cracks, gaps or openings occur between the successive links.

Figure 10:
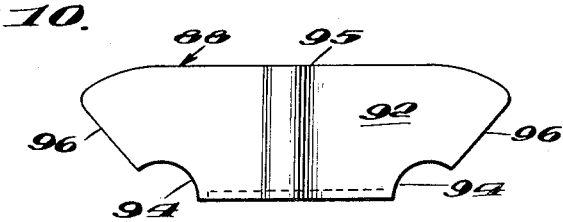
Figure 10 is a side elevation of a side wing which is attached adjacent to the outside edge of a marginally positioned belt link.
Figure 11:
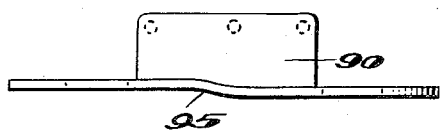
Figure 11 is a plan view of the side wing shown in Figure 10.

A plurality of rows of links may be assembled on the cross shafts as indicated in Figure 1, and the number of side by side rows 78, 80, 82, 84, 86 of longitudinally arranged links will determine the width of the conveyor belt 11. The chains 12 and 14 are spaced a distance apart to accommodate one or more side by side rows of longitudinally arranged links and the cross shafts 56 are made of such length that the outer side edge 64 of the links serves to maintain the outside link-bars 52 of the chains against axial displacement. The aforedescribed flexible conveyor may be formed into a trough-type conveyor by the provision of upstanding side wings along the outside edges of the conveyor belt as is shown in Figure 1. The upstanding side wings 88, best shown in Figures 10 and 11, are preferably formed with a base section 90 and a wing portion 92. The base section is formed at a substantial right angle to the wing portion and is secured to the body portion 62 of the link in substantial alignment with side edge 64 of each of the outside rows of links. The lower corners of each of the wing portions are formed with curved surfaces 94 which fit with close tolerances over the hinge loops of adjacent conveyor links. The curved surfaces are formed to fit with close tolerances over the hinge loops in order to prevent the escape of small particles or parts which may be conveyed on the conveyor apron. As is shown in Figure 11, the upstanding wings are formed with a central disposed curved section 95 so that the ends of the wings are located in parallel but offset planes, the amount of offset corresponding generally to the width of material employed in forming the upstanding side wings. The edges 96 of each of the upstanding wings are formed in angular relation with respect to the base section and the upstanding wings are supported on the body portion 62 of the links parallel to and with one end thereof in substantial alignment with the side edges of the link. The base section 90 and the upstanding wing portion 92 may be secured to the body portion of the link 60 by the use of bolts, welding, or other means, and when a plurality of wing equipped links are assembled in longitudinal rows, the edges of the wings will be arranged in an overlapping position, as is shown in Figures 1, 7, and 9. As the conveyor belt travels about the sprocket wheels, the upstanding side wings move in relation to each other, but due to the extended edges 96 of the winged portion 92, no separation occurs and thus the wing equipped conveyor provides a travelling trough upon which material may be transported.

The body portion 62 of the links 60 may be strengthened by a reinforcing member in the form of angles, strips or bars secured to either the upper surface or to the lower surface of the links, as is shown in Figures 5, 6, 8, and 12. The reinforcing member shown in Figure 12 is preferably formed of angle iron in order to provide rigidity to the body portion of the links and is positioned on the lower surface of the body portion and extends across a single link. The reinforcing members identified by reference numeral 100 shown in Figures 5, 6, and 8 are applied to the upper surface of the body portion and when positioned in this location, the upstanding side of the angle iron will serve as a pusher plate for material being transported by the conveyor. It will be apparent that the reinforcing members when applied either to the upper or lower surfaces of the links may extend transversely across a single link or may extend across the entire width of the conveyor belt as indicated in Figures 6 and 8. The reinforcing members are preferably secured to the body portion 62 of the links by welding, riveting, or other similar attaching operation.

The frame work which supports the aforedescribed conveyor belt is formed by an upper elongated trackway 102 and a lower elongated trackway 104 upon which the carrying rollers 58 make rolling contact. Trackways 102 and 104 are positioned in substantially parallel relationship and spaced apart a distance substantially equal to the diameter of sprocket wheels 16 and 26. The trackways may be formed of any desirable configuration including curved sections and straight-away sections. A concave curve positioned in the trackways is indicated by reference numeral 106, and as will be noted from the structure shown in Figure 8, an overhead guide 108 is positioned above trackways 102 and 104 to provide a guide channel for the carrying rollers as they move through the curved portion of the trackway. The upper elongated trackway 102 and lower elongated trackway 104, as well as the overhead guide members 108, are maintained in position by transverse supporting elements 110 and bracing members 112. The conveyor mechanism including the link belt and power driving mechanism therefor is supported in position by the use of supports 114 which may rest upon base members 116. The supporting mechanism shown is for illustrative purposes only, since other types of bracing and supports may be employed without departing from the spirit of my invention.

From the foregoing description of the conveyor mechanism, it will be apparent that due to the formation of the links and the manner of hingedly securing adjacent links, the conveyor belt will rotate about transverse axes located in the median plane of the body portions of each link. As a result thereof during movement of straight reaches of travel, the conveyor belt offers an imperforate surface and when the conveyor belt changes direction in travel either around the sprocket wheels or curved portion of the conveyor trackways, no openings, gaps, or cracks will occur. In view thereof, the conveyor belt of my invention is particularly well adapted for conveying materials having small particle size as well as large size objects, such, for example, as machine parts to be transported through annealing furnaces or from one processing station to another, and in addition, the conveyor is well suited for the transfer of chips, turnings, and other residue from machine operations.

I claim:

1. In a conveyor mechanism, the combination comprising an endless conveyor belt formed of a plurality of rows of links, each row of which comprises hinged links, and each link of which comprises a substantially flat, rigid, rectangular plate having side and end edges, a centrally located hinge loop positioned along one end edge thereof which extends throughout the middle portion of said edge, two hinge loops positioned along the opposite end edge with the outside edges of each of said loops being in substantial alignment with the side edges of said plate and the opposite edges of said loops spaced a distance apart equal to the length of said central hinge loop, all of said hinge loops extending above and below said plate and positioned with the axes thereof in an intermediate plane disposed equal distances from the flat surfaces of said plate, the loops of adjacent links of each row being alternately disposed with the axes thereof in alignment, upstanding side wings positioned adjacent to the outside edges of each link in the outermost rows of links in the conveyor belt, said wings provided with ends located in offset planes and extending beyond the hinge loops of said link, the lower edges of the ends formed to overlie the curved surfaces of the hinge loops, an endless chain positioned on each side of said conveyor belt formed of a longitudinal series of pairs of outside and pairs of inside side bars separated by rollers positioned adjacent to the terminal ends of said side bars, cross shafts positioned within said aligned hinge loops of adjacent links having ends extending therefrom which serve as mounting means for said chain side bars and said rollers, a pair of sprocket wheels located at each end of said conveyor belt for supporting and driving said chains, and a pair of rails extending lengthwise of the conveyor sides to support said rollers whereby the links are carried by the chains and cross shafts and the surface of the belt remains continuous during travel of the links in both straight and curved directions.

2. In a conveyor mechanism, the combination comprising an endless conveyor belt formed of a plurality of hinged links, each of said links comprising a substantially flat, rigid, rectangular plate having opposite end edges, a centrally located hinge loop positioned along one end edge thereof which extends throughout the middle portion of said edge, two hinge loops positioned along the opposite end edge with the outside edges of each of said loops being in substantial alignment with the side edges of said plates and the opposite edges of said loops spaced a distance apart equal to the length of said central hinge loop, all of said hinge loops extending above and below said plate and positioned with the axes thereof in an intermediate plane disposed equal distances from the flat surfaces of said plate, the hinge loops of adjacent links of said conveyor belt being alternately disposed with the axes thereof in alignment, upstanding side wings supported on links and positioned adjacent to the outside edges of the conveyor belt, said wings provided with ends located in offset planes and extending beyond the hinge loops of said links, the lower edges of the ends formed to overlie the curved surfaces of the hinge loops, an endless chain positioned on each side of said conveyor belt formed of a longitudinal series of pairs of outside and pairs of inside side bars separated by rollers positioned adjacent to the terminal ends of said side bars, cross shafts positioned within said aligned hinge loops of adjacent links having ends extending therefrom which serve as mounting means for said chain side bars and said rollers, a pair of sprocket wheels located at each end of said conveyor belt for supporting and driving said chains, and a pair of rails extending lengthwise of the conveyor sides to support said rollers whereby the links are carried by the chains and cross shafts and the surface of the belt remains continuous during travel of the links in both straight and curved directions.

3. In a conveyor mechanism, the combination comprising an endless conveyor belt formed of a plurality of hinged links, each of said links comprising a substantially flat rigid, rectangular plate having opposite end edges, hinge loops positioned along opposite ends of said plates with the loops on one end being spaced apart a distance substantially equal to the length of a loop on the opposite end of said link, said hinge loops extending above and below said plates and positioned with the axes thereof substantially parallel to said end edges and in a central plane disposed equal distances from the surfaces of said rectangular plate, the hinge loops of adjacent links of said conveyor belt being alternately disposed with the axes thereof in alignment, upstanding side wings positioned adjacent to the outside edges of the links in the conveyor belt, said wings provided with ends located in offset planes and extending beyond the hinge loops of said links, the lower edges of the ends formed to overlie the curved surfaces of the hinge loops, an endless chain positioned on each side of said conveyor belt formed of a longitudinal series of pairs of outside and pairs of inside side bars separated by rollers positioned adjacent to the terminal ends of said side bars, cross shafts positioned within said aligned hinge loops of adjacent links having ends extending therefrom which serve as mounting means for said chain side bars and said rollers, a pair of sprocket wheels located at each end of said conveyor belt for supporting and driving said chains, and a pair of rails extending lengthwise of the conveyor sides to support said rollers whereby the links are carried by the chains and cross shafts and the surface of the belt remains continuous during travel of the links in both straight and curved directions.

References Cited in the file of this patent

UNITED STATES PATENTS

| Number | Name | Date |
| --- | --- | --- |
| 302,574 | Ludlow | July 29, 1884 |
| 1,330,116 | Hunt | Feb. 10, 1920 |
| 1,440,791 | Morgan | Jan. 2, 1923 |
| 2,033,549 | Reuter | Mar. 10, 1936 |
| 2,186,767 | Price | Jan. 9, 1940 |
| 2,416,634 | McBride | Feb. 25, 1947 |
| 2,428,887 | Munro | Oct. 14, 1947 |